July 27, 1937.  A. NOBLE  2,088,032
FULLY COMPENSATED REMOTE READING THERMOMETER
Filed July 24, 1935
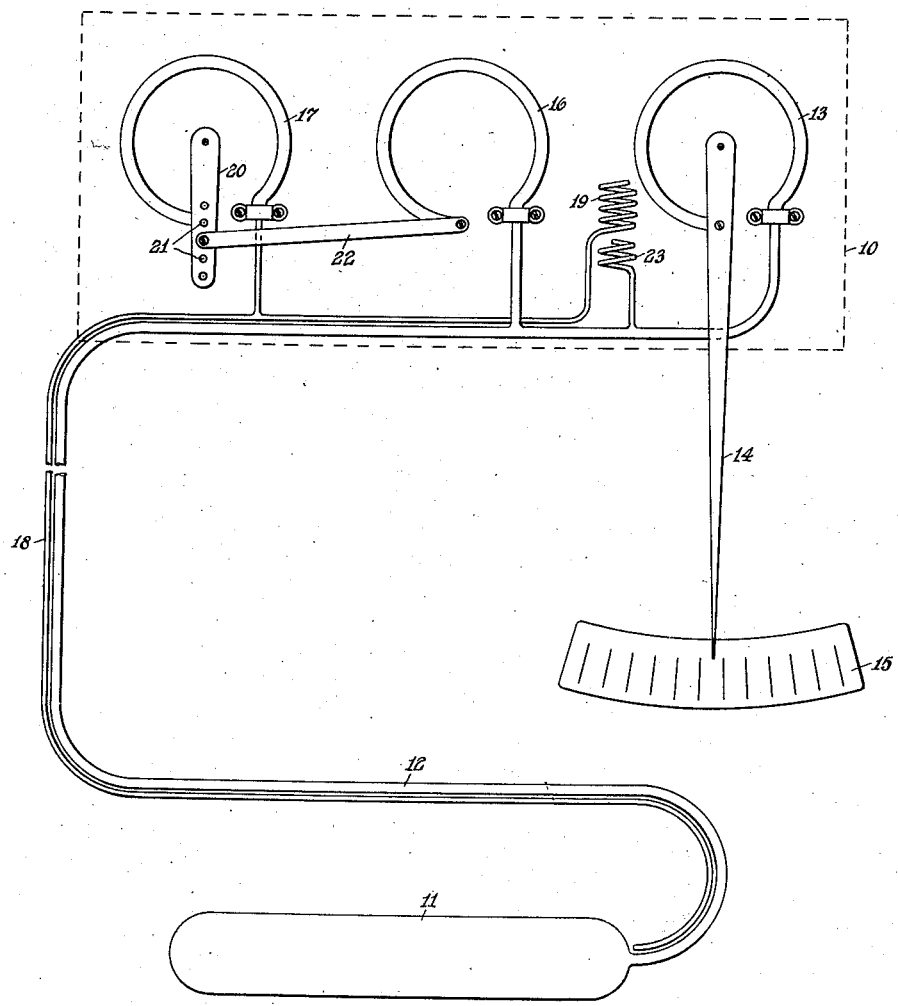
INVENTOR.
ALPHONSO NOBLE
BY
ATTORNEY.

Patented July 27, 1937

2,088,032

UNITED STATES PATENT OFFICE 2,088,032

FULLY-COMPENSATED REMOTE-READING THERMOMETER

Alphonso Noble, Naugatuck, Conn., assignor to The Bristol Company, Waterbury, Conn., a corporation of Connecticut Application July 24, 1935, Serial No. 32,869

6 Claims. (Cl. 73—52)

In the measurement of temperatures it is customary to make use of a Bourdon spring or equivalent element, actuated through a capillary tube by changes in the volume of a fluid medium contained in a bulb or closed chamber located at the point where temperature is to be measured. Highly accurate results may be obtained with this method, provided the bulb is the only part of the system exposed to a variable temperature; but where the temperature of the Bourdon spring or of the capillary tubing is subject to variation there is superimposed upon the principal volume variation due to temperature changes at the bulb parasitic variations due to the temperature changes of the spring and the tubing, thus introducing errors into the indications of the instrument.

It is an object of this invention to provide for the sources of error compensating means which shall be adjustable to individual conditions and essentially permanent in performance.

The single drawing is a diagrammatic representation of a preferred form of the invention, showing means by which the desired compensations and adjustments are effected.

Referring to the drawing, 10 designates a base plate upon which may be mounted the several elements of an instrument embodying the invention. The vessel adapted to be exposed to the temperature to be measured is represented by the closed bulb 11 which is connected by a capillary tube 12 to a Bourdon spring 13 mounted on the base plate 10; and the whole system thus formed is filled with an expansible fluid such as alcohol. The Bourdon spring 13 serves to actuate an index or pointer 14, whereby there is provided on a graduated scale 15 an indication representative of the internal volume of the Bourdon spring, and hence of the temperature of the expansible fluid within the system.

With a construction as above set forth it will be seen that the volume of the contained fluid within the system will be subject to the temperature not only of the bulb 11 but of the capillary tube 12 and the Bourdon spring 13. While these effects may be minimized by making the volume of the bulb large as compared with that of the latter elements, the increased dimensions of the sensitive element serve to increase the thermal lag of the device, and the compensation so effected can never be complete.

In order to afford complete compensation, a second Bourdon spring or variable volume element 16, which may be a duplicate of the Bourdon spring 13, is mounted on the base plate; and its interior space is placed in direct communication with the capillary tube, so that fluid pressures will be equalized throughout the system. Thus, if the spring 16 is left free to deflect, it will respond similarly to the spring 13 to volume changes in the system; and, for a given change in volume of the contained fluid, the deflection of the spring 13 will be substantially half what it would be if the spring 16 were not present. Similarly, if the spring 16 be forcibly restrained from deflecting in response to pressure changes within the system, the deflection of the spring 13 will be the same as though the spring 16 were absent. Further, it will be seen that if the spring 16 be forcibly deflected at a time when no change in temperature takes place in the system, the consequent change in volume will produce a substantially equal but opposite deflection of the spring 13. Thus, the indication of the pointer 14 on the scale 15 is dependent not only upon the temperature of the bulb 11, but also upon the position in which the Bourdon spring 16 (if not free) may be restrained.

The compensation which it is proposed to set forth consists in providing means whereby the spring 16 is forcibly deflected due to changes in temperature of parts of the system other than the bulb 11, and to such a degree that the resultant response of the spring 13 and the indicator 14 will represent temperature change in the bulb only.

To this end there is mounted upon the base-plate 10 a third Bourdon spring 17, having its interior space in communication with a capillary tube 18, the latter being in intimate thermal association with the capillary tube 12 of the main system, for example, paralleling the same. The capillary tube 18, moreover, terminates within the instrument in an extended portion 19 so positioned as to assume the temperature of the interior of the instrument, particularly of the Bourdon spring 13.

An arm 20, rotatable by the spring 17, is provided with means for utilizing its angular deflection at any one of several radii, as afforded, for example, by the tapped holes 21; and means such as a link 22 is provided for pivotally connecting the free end of the spring 16 to the arm 20 at a selected radius on the latter.

Furthermore, the capillary tube 12 is provided with an extended portion 23 in proximity to the extension 19, as a means of facilitating adjustment of the relative influence of the two tube systems. Since it is customary to adjust the volume of such an element by sealing off more or less of its end, and since this adjustment is not readily reversible, it is possible to compensate for a slight over-adjustment of the extension 19 by sealing off more or less of the extension 23.

In operation, the expansion of the Bourdon spring 13, as above set forth, would naturally be governed by the joint effect of the temperatures of the bulb 11, the capillary tube 12 and the spring itself. The spring 17, however, connected as described, will tend to respond to temperature changes in the capillary tube 18, which will be substantially the same as those in the tube 12. Through the link 22, the movement of spring 17 will be transmitted to spring 16, so that this spring will be forcibly distorted from its normal deflection, and in a sense to increase its volume disproportionately as regards temperature changes in the capillary tube 12. Thus, by proper proportioning of the relative strengths and volumes of the springs 16 and 17 and associated elements, and by selective positioning of the link 22 on the arm 20, the change in volume of the spring 16 in response to changes in the capillary tube temperature may be made such that the whole change of volume of the contained fluid due to temperature change in the capillary tube 12 will be accommodated in the spring 16, so that the spring 13 will not make any response to such temperature changes.

In a similar manner, temperature changes within the instrument, and particularly of the spring 13, being reproduced in the tubular extension 19, the deflection of spring 17, and hence of spring 16, will be further governed by these temperature changes; and if, by relative adjustment of tubular extensions 19 and 23, the interior volume of the former be rightly proportioned, space will thus be provided within the spring 16 for the increased volume of the contained fluid, due to temperature changes of the spring 13 and the interior of the instrument in general, so that these temperature changes will not be reproduced as a deflection of the spring 13. Thus there has been provided a complete compensation for temperature changes in any part of the system except the sensitive bulb 11, together with adjustments whereby the degree of this compensation may be varied to suit individual instruments and installations.

I claim:

1. In a temperature-measuring device of the fluid-filled type and embodying a closed vessel adapted to be exposed to the temperature to be measured, a pressure-sensitive resilient member and a tubular member connecting the same with the closed vessel: a variable volume element communicating with the fluid-filled system, a second pressure-sensitive resilient member, a tubular member communicating with the same and in thermal association with said first-named tubular member, and means pivotally connecting said second-named pressure-sensitive resilient member with the said variable volume element.

2. In a temperature-measuring device of the fluid-filled type and embodying a closed vessel adapted to be exposed to the temperature to be measured, a pressure-sensitive resilient member and a tubular member connecting the same with the closed vessel: a variable volume element communicating with the fluid-filled system, a second pressure-sensitive resilient member, a tubular member communicating with the same and in thermal association with said first-named tubular member, and a link adjustably connecting said second-named pressure-sensitive resilient member with the said variable volume element.

3. In a temperature-measuring device of the fluid-filled type and embodying a closed vessel adapted to be exposed to the temperature to be measured, a pressure-sensitive resilient member and a tubular member connecting the same with the closed vessel: a variable volume element communicating with the fluid-filled system, a second pressure-sensitive resilient member, a tubular member communicating with the same and in thermal association with said first-named tubular member and having a terminal portion of substantial volume in thermal association with said first-named pressure-sensitive resilient member for affording adjustment in the internal volume of said tubular member and variation in the internal pressure of the second pressure-sensitive resilient member to compensate for temperature effects on the first-named pressure-sensitive resilient member, and a mechanical connection between said second-named pressure-sensitive resilient member and the said variable volume element.

4. In a temperature-measuring device of the fluid-filled type and embodying a closed vessel adapted to be exposed to the temperature to be measured, a pressure-sensitive resilient member and a tubular member connecting the same with the closed vessel: a variable volume element communicating with the fluid-filled system, a second pressure-sensitive resilient member, an arm extending radially therefrom and actuated thereby, a tubular member communicating with said second pressure-sensitive member and in thermal association with said first-named tubular member, and a link connecting the said arm with said variable volume element.

5. In a temperature-measuring device of the fluid-filled type and embodying a closed vessel adapted to be exposed to the temperature to be measured, a pressure sensitive resilient member and a tubular member connecting the same with the closed vessel: a variable volume element communicating with the fluid-filled system, a second pressure-sensitive resilient member, an arm provided with perforations at its outer end, extending radially outwardly from the said second pressure-sensitive resilient member and actuated thereby, a tubular member communicating with said second pressure-sensitive resilient member and in thermal association with said first-named tubular member, and a link pivotally connected with the variable volume element and adapted for pivotal connection in a selected one of the perforations of said arm.

6. In a temperature-measuring device of the fluid-filled type and embodying a closed vessel adapted to be exposed to the temperature to be measured, a pressure-sensitive resilient member and a tubular member connecting the same with the closed vessel: a variable volume element communicating with the fluid-filled system, a second pressure-sensitive resilient member, a tubular member communicating with the same and in thermal association with said first-named tubular member, both of said tubular members having extensions of substantial volume and being in thermal association with each other and with the said first-named pressure-sensitive resilient member for affording adjustment in the internal volume of the two defined closed systems and variation in the internal pressure of the second pressure-sensitive resilient member to compensate for temperature effects on the first-named pressure-sensitive resilient member, and a mechanical connection between said second-named pressure-sensitive resilient member and the said variable volume element.

ALPHONSO NOBLE.